United States Patent [19]

Terashita et al.

[11] Patent Number: 4,668,082
[45] Date of Patent: May 26, 1987

[54] METHOD OF DETECTING PRINCIPAL SUBJECT IMAGE AND DETERMINING EXPOSURES IN COLOR PRINTING

[75] Inventors: Takaaki Terashita; Takao Shigaki, both of Kanagawa, Japan

[73] Assignee: Fuji Photo Film Co., Ltd., Kanagawa, Japan

[21] Appl. No.: 857,628

[22] Filed: Apr. 30, 1986

[30] Foreign Application Priority Data

Feb. 17, 1986 [JP] Japan .................................. 61-32389

[51] Int. Cl.$^4$ ....................... G03B 27/32; G03B 27/80
[52] U.S. Cl. ......................................... 355/77; 355/38; 355/68
[58] Field of Search ................. 355/38, 35, 68, 77; 356/222, 224, 404–406

[56] References Cited

U.S. PATENT DOCUMENTS

| | | | |
|---|---|---|---|
| 3,708,676 | 1/1973 | Huboi et al. | 355/68 X |
| 3,790,275 | 2/1974 | Huboi et al. | 355/68 |
| 4,017,179 | 4/1977 | Pone, Jr. et al. | 355/68 |
| 4,080,066 | 3/1978 | Betzold et al. | 355/38 X |
| 4,168,121 | 9/1979 | Freier et al. | 355/38 |
| 4,279,505 | 7/1981 | Ursprung et al. | 355/38 X |
| 4,353,641 | 10/1982 | Merlo | 355/38 |

Primary Examiner—Richard A. Wintercorn
Attorney, Agent, or Firm—Young & Thompson

[57] ABSTRACT

Color densities of a color original are measured for a number of picture elements into which the color original is divided. A part of the color original that includes at least one picture element is selected, with whose measured color densities the measured color densities of each picture element are compared to detect picture elements of color densities having a certain relation to the color densities of the selected part of the color original. The picture elements of sufficiently similar color densities can define an extent of image which determines a principal subject image and the remainder of which is background. For the individual image, at least one characteristic value peculiar to the image is then calculated by utilizing the measured color densities of picture elements, and on the basis of the characteristic values the scene of the original is classified to select one of a plurality of previously provided exposure calculating formulas in order to determine the proper exposure for obtaining color prints of proper color balance and density.

21 Claims, 12 Drawing Figures

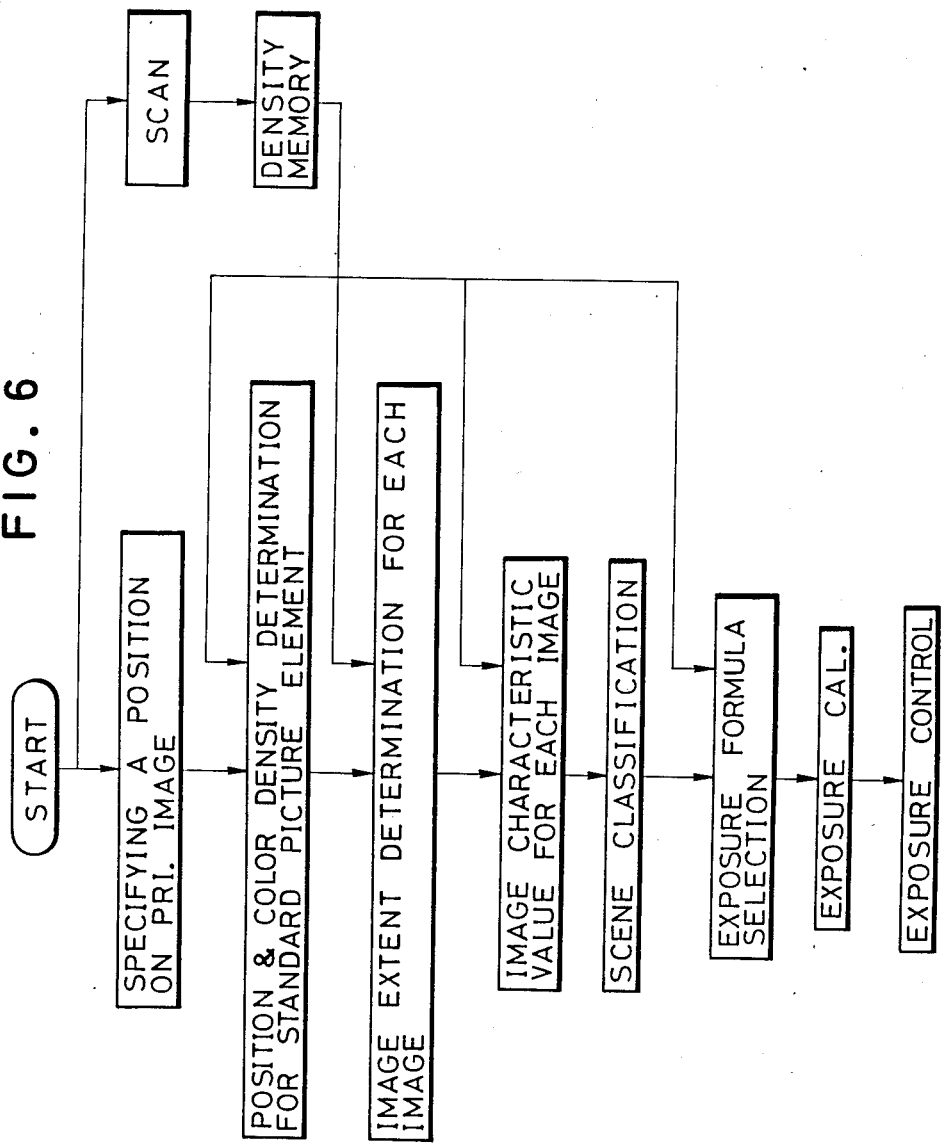

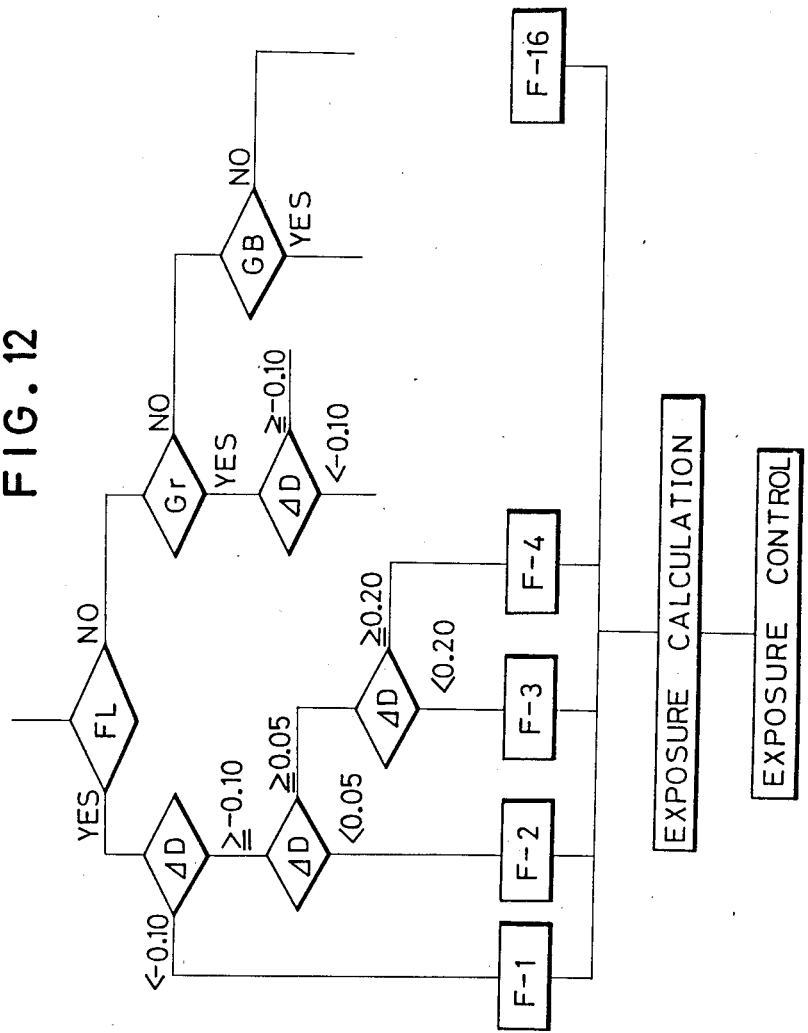

METHOD OF DETECTING PRINCIPAL SUBJECT IMAGE AND DETERMINING EXPOSURES IN COLOR PRINTING

BACKGROUND OF THE INVENTION

The present invention relates to a method of determining a principal subject image of color originals based on color densities, and a method of determining exposures in color printing which is made in accordance with the principal subject image of color originals.

In making positive color prints on color paper from color originals such as color negatives, color positives or the like, it is usual to control the exposure or the proportion of the primary color (blue, green and red) components of printing light in accordance with the large area transmittance densities (hereinafter referred to as LATDs) of the primary colors of the color original from which color prints are made. This printing system is well known in the art as a LATD printing system.

It is also well known in the art that almost all ordinary color originals include a background besides a principal subject image.

Since, in the above-described conventional LATD printing system, the determination of exposures is independent of the primary color densities of the principal subject image of color originals, the obtained prints are not always satisfactory because of improper color balance and/or color density of the principal subject image thereof.

In order to solve the above-described problem in the LATD printing system, there has been proposed a method of color printing in which the image of a color original is displayed on a CRT screen of a color monitor and a point on a principal subject image such as the human face is specified by means of a light pen in order to measure the primary color densities of the point according to which the proportion of the primary color components of printing light are controlled. This method is disclosed in, for example, Japanese Patent Unexamined Publ. No. 58-9136.

In this method, however, there is a problem that, since only a part of the principal subject image of the color originals is specified to be measured, the color densities cannot be obtained accurately for the whole area of the principal subject image. This problem can be solved by specifying the boundary between the principal subject image and its background image by using a position specifying means such as a light pen. This solution is, however, undesirable and hardly practicable owing to a troublesome and time-consuming operation of specifying the boundary. As a matter of course, in order to determine the exposure or the proportion of the primary color components of printing light based on the color densities of a part of the principal subject image of color originals, it is necessary to obtain exact primary color densities. However, this is very difficult in practice because there are a large number of color originals of high contrasts and/or small principal subject images. In addition, the fact of disregarding the background ground when determining the exposure results in reproducing unfaithful prints.

There has also been disclosed in, for example Japanese Patent Publ. No. 55-29412, a method of color printing for solving the above-described problem in which a color original is divided into plural image sections, one of them being chosen as a principal subject image. The chosen image section is scanned at a number of points (picture elements) to obtain a plurality of color densities thereof, from which at least one kind of characteristic density value is calculated. Based on the characteristic density values thus obtained and the LATDs of the color original, the exposure or the primary color components of printing light is controlled.

In this method, it is also necessary to obtain exact characteristic density values. Nevertheless, because of the relatively extensive divided sections, there is often included in the chosen section a part of a background image besides the principal subject image as a result of a visual analysis of an operator. For example, when the principal subject matter of the human figure has been photographed with a back light, the chosen section of the color original sometimes contains therein parts of the human figure and sky. As a result, confusion arises as to which is the intended principal subject matter: the human figure or the sky, and as a result, wrong characteristic density values will be used to control the exposure in color printing. In addition, the use of only the characteristic density values makes it impossible either to recognize color originals whose scenes are photographed with a back light or to calculate the value of exposure to be corrected in accordance with the LATDs.

There has been disclosed in, for example, Japanese Patent Unexamined Publ. No. 59-164547 still another method of color printing in which, in order to calculate exposures, one of a plurality of different formulas previously provided is selected through a selection key according to differences in density between the principal subject and its background images of color originals, the difference being judged by an experienced visual observer. In this method, it is possible to control the exposure with a high accuracy depending on closely grouped scenes in which the color originals are classified. This classification of color original, which is effected through visual analysis by the operator, is attended by individual differences in visual analysis, uncertain judgments and the like, and the provision of the closely grouped scenes is not always efficient. Consequently, the method is, although basically highly efficient, useful with only several scenes.

There has also been disclosed in, for example, Japanese Patent Unexamined Publs. Nos. 52-156624 and 53-145620 a method of color printing in which a particular extent of color on negatives is defined corresponding to flesh color on positives (this particular extent of color is hereinafter referred to as flesh color). A color original is scanned to obtain the primary color densities for each of a number of points (picture elements) on the color original in order to automatically judge whether or not each picture element has its color falling within the limits of flesh color previously defined, so as to control the exposure based on the mean color densities of the picture elements of flesh color. According to this method, in case the color originals include walls or the like which have a color similar to the flesh color of the human body, it is apt to take the walls for a part of the human body and to confuse gray color with flesh color, this color confusion being attributable to changes on standing in the characteristics of the film and the illumination lamps, resulting quite often in incorrect exposure controls in color printing.

SUMMARY OF THE INVENTION

Accordingly, the primary object of the present invention is to provide a method for automatically determining the precise extent of a principal subject image of color originals.

Another object of the present invention is to provide a method for determining exposures in color printing so as to make exposure controls both with high accuracy and with ease.

In accordance with the present invention a color original to be printed is measured for its color densities at a large number of points on (picture elements of) the color original. In order to determine the extent of a principal subject image of the color original, the measured color density or densities of each picture element is compared with the color density or densities of a part of the color original which is specified by use of an image specifying means to judge whether or not the respective picture elements have color densities identical or similar either directly or indirectly to the color densities of the specified part of the color original. For the color densities, it is permissible to use the primary color densities of red, green and blue, combined values obtained from either these three or any two of the primary color densities, and a visual density etc. It is also permissible, if convenient, to use either the gray density obtained from the three primary color densities or one of the three primary color densities, for example the green color density.

There are two ways of color density judgments, namely a direct comparison method and an indirect comparison method. In the former method, the color densities of each picture element are compared directly with the color densities of the specified part of the color original which are assigned for standard values. On the other hand, in the latter, the standard value is changed. With these changed standard values, the color densities of each picture element are compared to make the density judgment relative to the specified part of the color original. In this sense, the latter is considered to be indirect. This indirect comparison method is conducted to assume the extent of image, which has a continuity in color density, to be a principal subject image. There are two ways in this indirect comparison method; one of which uses as a standard value the color density of a picture element which has been judged to be one of picture elements defining the extent of a principal subject image and is adjacent to a picture element whose color density is subsequently judged; the other uses as a standard value the mean value of color densities of the picture elements which have been judged to define the extent of a principal subject image.

According to an important feature of the present invention, the extent or range of particular principal color densities of a color original is first defined. When the specified part is judged to have color densities falling within the extent or range of the particular color densities in question, each picture element of the color original is judged as to whether or not its color falls within that range.

It should be noted that in this specification, the term "color density" means the density of monochromatic color such as red, green or blue and is obtained in such a way that the light either transmitted by or reflected from color originals is measured, after passing through a filter which permits a narrow band of wavelengths of light to pass therethrough, by using an image sensor whose outputs are processed to provide density values.

According to a method of determining printing exposures of the present invention a color original to be printed is divided into a number of picture elements of which each one is measured as to its color densities. In order to determine the exposure for the color original, the measured color densities of each picture element are compared either directly or indirectly with the color densities of a particularly specified part of the color original to judge whether the respective picture elements have color densities identical or similar to the color densities of the specified part of the color original. Based on this judgment the extent of the image is defined by the picture elements both with the identical color densities and with similar color densities and determined to be a principal subject image. Either the whole or a part of the remaining image is determined to be a background image. At least one kind of image characteristic value is extracted from the principal subject image and from the background image, respectively, based on the color densities of the picture elements, in order to classify the scene of the color original. Based on the classified scene one adequate formula for calculating the printing exposure is selected from previously provided various formulas corresponding to scenes into which color originals are to be classified.

According to an important feature of the present invention, the extent of a principal subject image can be automatically determined by specifying only a part of the image of a color original with particular color densities, which enables printing operations to be easily performed. Furthermore, the extraction of the image characteristic values from the principal subject and background images of color originals, on the basis of which the color originals are classified into scenes and the appropriate formula is chosen from among formulas previously provided corresponding to the scenes in order to calculate the exposures, contributes to avoiding individual differences between operators in visual analysis, and so makes possible accurate exposure controls in color printing. Since the same formula is applied to color originals which have relationships between their principal subject and background images similar to each other, the selection of a formula is highly accurate.

Otherwise, the exposure can be determined based on scenes into which the color originals are classified in accordance with the image characteristic values both of the determined principal subject image and of the background image.

It is also possible to determine the exposure in such a way that the appropriate formula including mean color densities as terms is chosen among formulas previously provided corresponding to scenes into which the color originals are classified on the basis of colors obtained from the mean color densities which are obtained from the color densities of the picture elements of a principal subject image.

BRIEF DESCRIPTION OF THE DRAWINGS

FIG. 6 is a flow chart showing a sequence of exposure control on the color printer of FIG. 1;

FIG. 12 is a flow chart showing a sequence of scene classification and the selection of exposure calculation formulas.

DETAILED DESCRIPTION OF THE INVENTION

Figure 1:
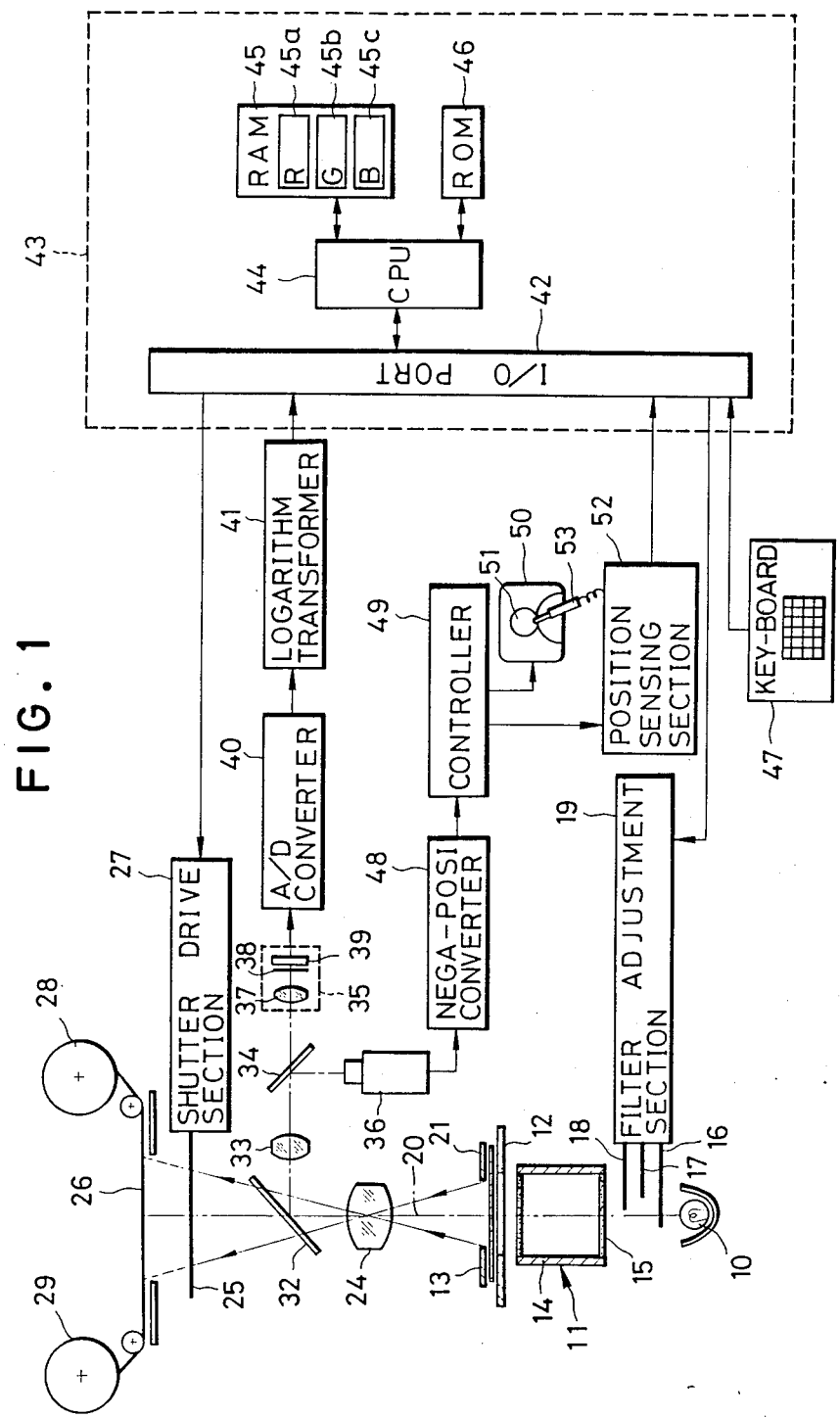
FIG. 1 is a schematic view of a color printer to which the present invention is applied.

Referring now to FIG. 1 showing a color printer with which a method for determining exposures according to the present invention is applied, there are three complementary color filters 16, 17, 18, namely cyan, magenta and yellow. Each color filter 11, 12, 13 is controllably insertable independently of the other two between an illumination lamp 10 and a diffusion box 11 which comprises a square hollow tube 14 having inner mirrored walls and top and bottom diffusion plates 15. The white light from the lamp 10 passes through the control filter 16, 17 or 18 into the diffusion box 11 and is diffused thereby. The diffused light, after passing through a color original or color negative 13 placed between a negative carrier 12 and a mask member 21 so as to be held flat in an exposure position, is focussed on a color paper 26 by means of the enlarging lens 24 to create a latent image of the color original 13 under the control of a shutter 25 which is controlled by a shutter control 27 to open for a certain time, providing a standardized exposure time. After exposure, the color paper 26 is wound up on a take-up reel and an unexposed part thereof is withdrawn from a supply reel 29 to be placed in the exposure position.

In the optical path 20 of the illumination light, a half-mirror 32 is disposed inclined by, for example in this embodiment, 45° to reflect the illumination light and then to direct it to another half-mirror 34, the light is divided into two beams, namely the light reflected toward a color TV camera 36 and the light transmitted to a sensor unit 35 comprising a lens 37, a color filter 38 and an image sensor 39. The lens 33 in front of the half-mirror 34 focuses the image of the color original 13 on the image sensor 39. From this sensor unit 35, color signals of red, green and blue can be extracted either independently by color or mixed for each picture element of the image of the color original. For example, in this embodiment, a single image sensor which is contributive to decreasing the cost of the color printer is used to detect the three color signals of the image for 100×100 picture elements (measuring points) thereof. It is of course permissible to replace the single image sensor by three image sensors for red, green and blue.

The respective color signals from the sensor unit 35, specifically from the image sensor 39, are transferred to an A/D converter 40 and converted thereby into digital signals which are, after being logarithmically transformed into corresponding color density signals by a logarithmic transformer 41, transferred into a microcomputer 43 through 1/0 port 42 thereof. This microcomputer 43 is well known per se and comprises the 1/0 port 42, a CPU 44, a RAM 45 and a ROM 46, so as to control the operations of components as well as to calculate exposures, as will be described later. The color density signals thus transferred are separated by color and stored in respective frame memories 45a, 45b, 45c. A keyboard 47 is provided to instruct the respective components to operate under the control of the microcomputer 43.

The color TV camera 36 picks up the color negative image of the color original 13 and produces video signals. These video signals from the color TV camera 36 are transferred to a posi-nega converter 48 to be converted into positive video signals. The positive video signals thus converted are then transferred through a controller 49 to a color monitor 50 in order to display the positive image 51 on its screen. The controller 49 is adapted to produce, based on synchronizing signals, position signals which in turn are sent to a position detecting section 52.

On the other hand, an operator visually observes the positive image 51 on the screen of the monitor 50 and specifies a part of the positive image 51 which is considered to be a principal subject image from visual analysis. The operator touches the part of the principal subject image with a position-specifying means, for example, a light pen 53. This light pen 53, as is well known per se in the art, is adapted to receive light from the screen of the monitor 50 when the corresponding part of the monitor is illuminated and to photoelectrically convert the received light into a signal which in turn is sent to a position-detecting section 52. As a result, position information which represents the position of the specified part on the positive image 51 touched by the light pen 53 is given to the microcomputer 43.

As the position specifying means, it is possible to replace the light pen 53 by touch panels, joysticks, digitizers, track-balls or X-Y cursors. In addition, it is practicable to use a spot light illuminator turning on and off or a LCD panel of which a part can dim out so as to illuminate a part of the color original 13. The difference in transmitted light through a particular part of the color original 13 between the two illuminated conditions is detected by the image sensor unit 35 to detect the position of the particular part. In addition, it is possible to illuminate a spot on a principal subject image to detect the density of the spot to be compared with the base density of the color negative and then to find a picture element whose density is lower than the base density.

Figure 2:
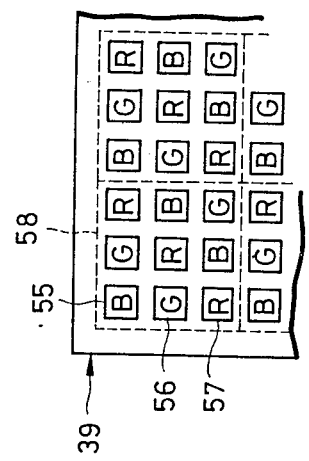
FIG. 2 is an explanatory illustration of an example of an image sensor.

Reference is now had to FIG. 2 showing by way of example the image sensor 39 used in the image sensor unit 35 of FIG. 1. The image sensor 39 is comprised of a large number of photoelectric conversion elements 55, 56, 57 of the three primary colors, namely, blue, green and red which are regularly arranged in a certain order to form a matrix. Each photoelectric conversion element has a filter of corresponding color on its lightreceiving surface, as is well known in the art. The photoelectric conversion elements are grouped in matrices, each of which includes three photoelectric conversion elements both per column and per row to form a single color signal detector 58 for each picture element of the color negative image projected onto the image sensor 39. In FIG. 2, the respective single color signal detectors 58 are shown in dotted line.

When extracting color signals, color signals from photoelectric conversion elements in a single picture element are extracted additively by color, or else are extracted mixed and then added by color in the microcomputer 43, and stored in the RAM 45. In this example, it is advantageous that photoelectric conversion elements for the same colors are properly distributed in a single color signal detector 58 to eliminate the occurrence of color registration to a considerable extent. It suffices in this image sensor 39 to arrange the color signal detectors 58, approximately 100 both per column and per row. For simplicity, it is desirable to form each color signal detector consisting of three photoelectric conversion elements arranged either in a single rank or file, or at the vertices of a triangle.

Figure 3:
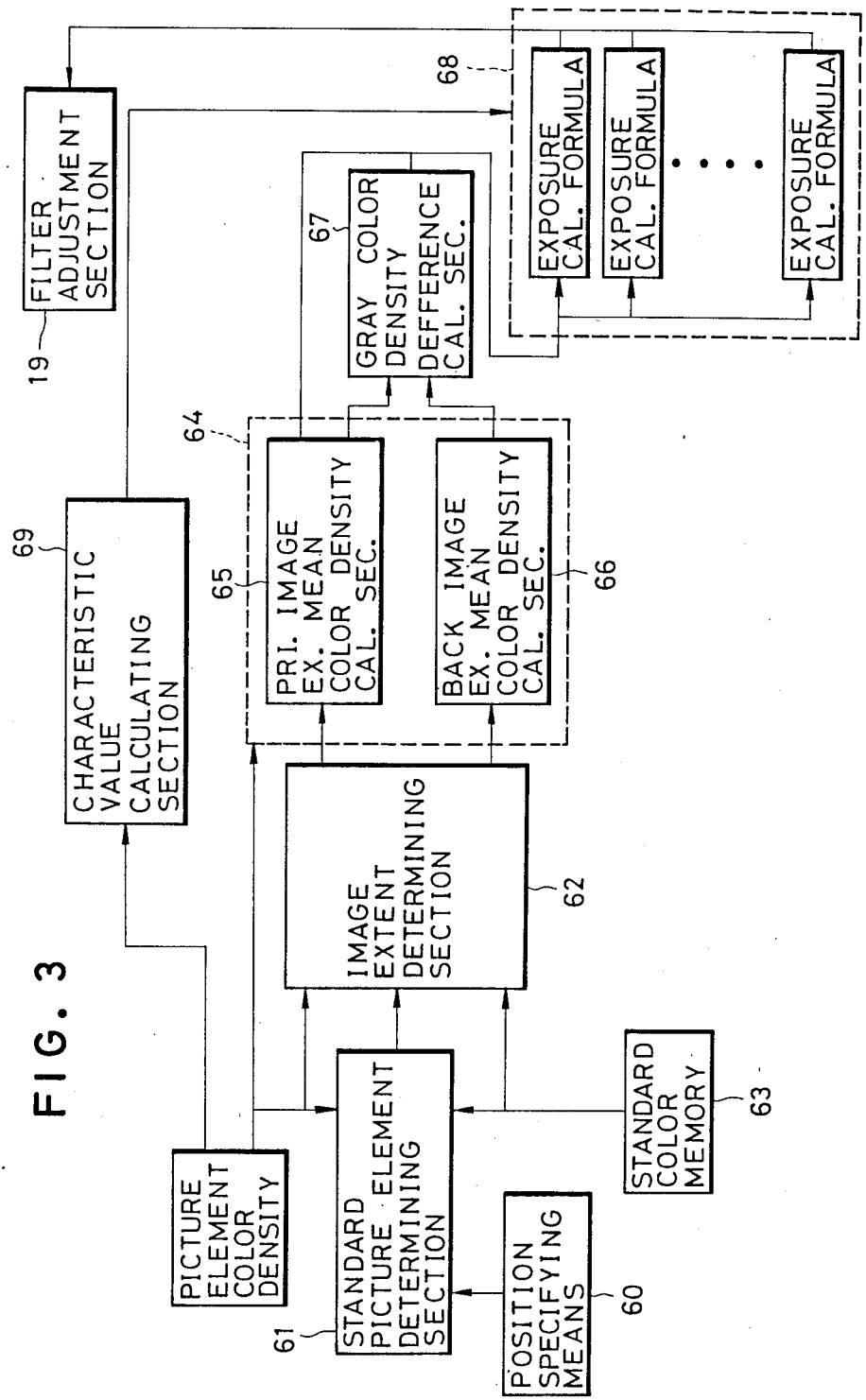
FIG. 3 is a functional block diagram illustrating an example of a microcomputer used in the color printer of FIG. 1.

Referring now to FIG. 3, there is shown the microcomputer 43 in a functional block diagram.

Information on the coordinates of the part specified by the position specifying means 60 is transferred to a standard picture element judging section 61 in order to designate as standard a picture element included in the specified part of the principal image. In the designation of a standard picture element, if plural picture elements of the same color densities are included in the specified part, one at the center of the specified picture elements is designated as standard. On the other hand, if there are plural picture elements of different color densities in the specified part, the designation of the standard picture element may be made in a predetermined order of priority. In the event there are plural picture elements of color densities given first priority, one at the center of these picture elements is designated as standard.

The information on the position and color density of the standard picture element is transferred to an image extent determining section 62 where picture elements of color densities identical or similar to the color density (red color density, green color density, blue color density or the combined value of these color densities) of the standard picture element are detected. The part of the image containing identical and similar color densities of picture elements is designated the principal subject image; on the other hand, the remaining part of the image is designated the background image. For this purpose, picture elements are judged in succession proceeding outwardly from the standard picture element, based on their color densities. At the time of judgment, it may be expedient to automatically designate as background those parts of the image which are outside the principal subject image by a certain number of picture elements, and/or the upper part of a picture frame and/or the margins of a picture frame.

Usually, it is permissible to use the red, green and blue color densities of the specified part for defining the color densities of the standard picture element. In this case, since the color density decision is made based on the color of the specified part at the center, if the color of the specified part is a little different from the original color of the principal subject matter photographed, the extent defining a color similar to the color of the specified part will deviate from the extent defining a color similar to the original color. For this reason, a principal subject image may sometimes be mistaken for a part of a background image, and the reverse applies in some cases.

In order to avoid such misjudgments, there is previously defined with color densities (which is referred to as a standard density) the extent defining a particular color (which is hereinafter referred to as a standard color) within which colors of a number of images to be determined as a principal subject image fall. When the color densities of a standard picture element fall within the extent of the standard color, the judgment as to principal subject image of color originals is made, based on the standard color thus defined.

By contrast, when the density of the standard color deviates a little, the deviation depending on the differences in characteristics of films, the extent of the standard color may be changed on the basis of the correct color of the standard picture element.

In general, the principal subject matter to be photographed is apt to be the human figure. Therefore, it is often suitable to use as a standard color flesh color reproduced in positive images. It is also suitable to use colors which are reproduced as gray (neutral color) in positive images when the principal subject matter to be photographed is snow, buildings, stone constructions and the like.

Figure 4:
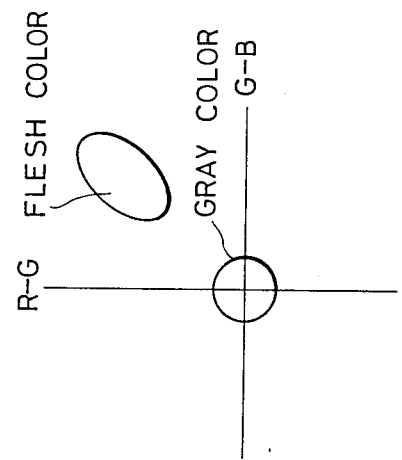
FIG. 4 shows color maps which define flesh color and gray color in a two-dimensional coordinate system the axes of which respectively represent the density differences between green and blue densities, and between red and green densities.
Figure 5:
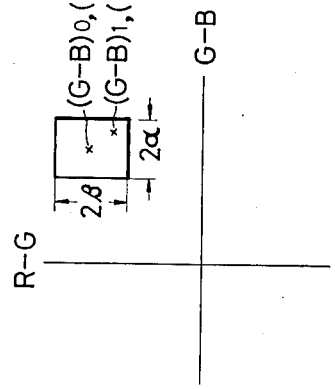
FIG. 5 is a color map which defines the extent of similar color in a two-dimensional coordinate system the axes of which respectively represent the density differences between green and blue densities, and between red and green densities.

The extents defining these standard colors can be determined by the use of color density maps in a two-dimensional coordinate system the axes of which respectively represent the density differences between green and blue densities (G-B), and between red and green densities (R-G), as shown in FIG. 4. Otherwise, it is possible to determine the extent by the use of a closed steric color map in a three-dimensional coordinate system whose axes respectively represent the red, green and blue color densities. When the color densities of a specified picture element fall within any one of these defined extents, it is determined to be standard color.

The above-described determination based on standard colors is carried out according to color densities measured on color originals or negatives. Consequently, the colors on color originals or negatives are complementary relative to the corresponding colors to be reproduced on positives. In the following description, for understanding the present invention more easily, all colors are referred to colors reproduced on positives. The definition of flesh color and a method for judging the picture elements of flesh colors is disclosed in, for example, Japanese Patent Unexamined Publ. Nos. 52-156624 and 53-145620.

For determining more easily standard colors, it is suitable to determine the extent defining a particular color by the use of a rectangular color density map in a two-dimensional coordinate system whose axes respectively represent the density differences between green and blue densities (G-B), and between red and green densities (R-G). In this case, the extent defining a particular color is previously determined by the coordinates of a point $[(G-B)_0, (R-G)_0]$ and the distances $\alpha, \beta$ along the respective axes. When a density of picture element having its coordinates $[(G-B)_1, (R-G)_1]$ satisfies the following absolute inequalities, the color is determined to be standard;

$$|(G-B)_0 - (G-B)_1| < \alpha$$

and $$|(R-G)_0 - (R-G)_1| < \beta$$

In a standard color memory 63, there is stored the data for defining the extent of standard colors in the form of color densities. The standard picture element determining section 61 judges with reference to the data in the standard color memory 63 whether the color density of the standard picture element falls within the density extent of the standard picture element. As a result of this judgment, if in fact the color of the standard picture element falls within the standard color, each picture element is judged by comparing its color density with the data in the standard color memory 63 whether the picture element has the standard color to determine a principal subject matter by defining it with the picture elements of the standard color. If the standard picture element is judged based on its density to have no standard color, the image extent determining section 62 judges whether the color density of each picture element is either identical or similar to the color density of the standard picture element.

In this event, the extent defining similar color densities is represented by color density maps such as circles, rectangles, spheres or the like in two- or three-dimensional coordinate systems. Specifically, when the color density coordinates of the picture element to be compared is within a color density map with a center at the color density coordinates of the color of the standard picture element, the color densities are judged to be similar to the color densities of the standard picture element.

Since the image extent determining section 62 determines the extents of principal subject and background images, it is possible to calculate the printing exposure for the color original based on image characteristic values extracted from the determined respective images. For example, the calculation of the red, green and blue components of printing light may be effected based either on the red, green and blue mean densities of the determined principal subject image, or on the red, green and blue mean densities of both images. In order to control the printing exposure with a high accuracy, in this invention, image characteristic values are calculated for each image of the color original and based on these the color original is classified by scene. According to the scene of the color original, a corresponding formula is selected from different kinds of formulas for different scenes into which the color originals are classified, and to calculate the proportion of the red, green and blue components of printing light. While there are several kinds of values, considered to be such image characteristic values, red, green and blue mean color densities are used in this embodiment.

The information on positions of the images is transferred to an operation section 64 comprising mean color density calculating sections 65, 66 for principal subject images and background images, respectively, in order to calculate the mean color densities of red, green and blue for each image. Specifically, the mean color density calculating section 65 retrieves from the RAM 45 the red, green and blue densities of the respective picture elements included within the extent of the principal subject image, and then calculates the mean color density for each color, and, on the other hand, the mean color density calculating section 66 calculates the mean color density for each color of the background image in the same way as for the principal subject image. Each mean color density is obtainable either as an arithmetical mean value resulting from the total of color densities of all the picture elements divided by the number of the picture elements considered or as a median value between maximum and minimum densities.

The red, green and blue mean color densities for each image are transferred to a density difference calculating section 67 in order to calculate the gray density difference between gray densities of the two images which in turn is used as one piece of information for the scene classification of the color original. In this section 67, a mean value or gray density is obtained from an arithmetical mean value of the mean color densities of red, green and blue for each image. From the obtained gray densities of the two images, a difference in gray density is calculated.

The mean color densities of red, green and blue of the principal subject image and the gray density difference value are transferred to a calculation formula selection section 68 in which are provided various exposure calculating formulas corresponding to various kinds of scenes into which the color originals are classified. In this section 68, a scene decision is made based on the combination of the mean color densities and the gray density difference value transferred thereto so as to select a proper formula corresponding to the kind of scene. As information for the scene decision, the gray density difference value may be replaced by either a ratio of the gray densities or a linear combination of the mean color densities of the respective images. For the exposure calculating formulas, there are known various formulas such as those disclosed in Japanese Patent Unexamined Publ. Nos. 52-23936 and 54-28131, and formulas using extreme (maximum and minimum) values of color density, means color density values of image areas (upper- and lower-half sections of a color original) or histogram values as the characteristic values for scene classification. It is also known to add to these exposure calculating formulas the mean color densities of the principal subject and background images of the color originals.

A characteristic value calculating section 69 calculates based on the color densities of red, green and blue of the respective picture elements stored in the RAM 45 the characteristic values and transfers them to the exposure calculating section 68. For obtaining the print exposure in the exposure calculating section 68, the characteristic values are substituted in the selected formula. According to the resulting print exposure, the filter adjusting section 19 adjusts the amount of insertion of each filter 16, 17, 18 into the illumination light path 20.

FIG. 6 shows a sequence of exposure control with reference to which the operation of the color printer of FIG. 1 will be explained.

The color original or negative 13 is moved by means of a transfer mechanism (not shown) to position a picture frame to be printed between the negative carrier 12 and the mask member 13. At this time, each color filter 16, 17, 18 is retracted from the illumination light path 20 so as to allow a part of the white light from the lamp 10 to pass into the diffusion box 11 and to be diffused thereby. The diffused light, after passing through the negative 13 and the enlarging lens 24, reaches the half-mirror 32. The transmitted part of the light is focussed on the color paper 26 and, on the other hand, the reflected part of the light is directed to the other half-mirror 34 after passing through the lens 33. The half-mirror 34 divides the light incident thereto into two beams, the transmitted light being directed toward the sensor unit 35 and the reflected light toward the color TV camera 36.

The sensor unit 35 scans a color negative image focussed on the image sensor 39 therein to measure each picture element of the negative image so as to detect the red, green and blue components of light and then to provide color signals of red, green and blue for each picture element. The color signals are converted into color densities after a logarithmic transformation and then stored in the RAM 45 of the microcomputer 43, separately by color. On the other hand, the color TV camera 36 provides video signals of the negative image which are, after a negative-positive transformation, transferred to the color monitor 50 so as to display the positive image of the color original 13 on its screen. A part of the positive image which is recognized through visual observation to be a part of a principal subject image is specified by use of the light pen 53. The position information of the specified part of the principal subject image is input into the microcomputer 43.

Figure 7:
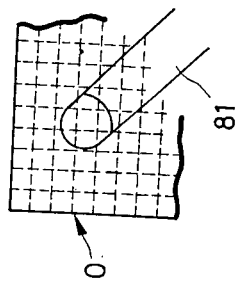
FIG. 7 is an explanatory illustration of an example of an image extent table.

In the microcomputer 43, a standard picture element is judged as described hereinbefore and the extends or boundaries of the principal subject and its background image are determined based on the color of the standard picture element thus judged. The results of this image extent determination are written in an image extent table of the RAM 45. In FIG. 4, showing the image extent table corresponding to the negative image, each picture element 73 shown in dotted line is measured by use of a single color signal detector 58 shown in FIG. 2. When the standard picture element 74 which is shaded in FIG. 7 is determined, a rectangular judging area 75 having its center at the position of the standard picture element is established. Within the judging area, picture elements are judged as to whether their colors are identical or similar to the color of the standard picture element, so as to define a principal subject image. The reason for establishing such a judging area is to perform the determination of the principal subject image with a high accuracy, on the assumption that a principal subject image extends around the standard picture element and that parts of an image relatively far away from the standard picture element are often independent of any part of a principal subject image. Otherwise, it would be difficult to determine the extent of a principal subject image from the continuous distribution of picture elements starting from the standard picture element, without establishing a judging area.

After the establishment of the judging area 75, the standard picture element 74 is judged whether or not it has the standard color based on its color densities. When the standard picture element 74 has the standard color, each picture element in the judging area 75 is judged by comparing its color densities retrieved from the RAM 45 with the standard color stored in the standard color memory 63 with its definition. On the other hand, if the standard picture element 74 has a color different from the standard color, each picture element in the judging area 75 is judged as to whether or not its color densities are identical or similar to the color densities of the standard picture element. In any event, the results of the judgment are written into the image extent table. As a result of this, the extent defining a principal subject image 76 which is shaded in FIG. 7 is determined and the remaining part excluded from the principal subject image 76 is determined to be a background image.

Otherwise, when the number (or total area) of the picture elements defining a principal subject image reach a predetermined number (area), the judgment may be stopped. In this way, a part of a widely extended principal subject image is assumed as principal and the remaining part of the whole image as background. This judgment can avoid time-consuming operations, and makes it possible to obtain an image characteristic value weighted on the area surrounding the specified part. It is desirable that the maximum number of picture elements of a principal subject image is between one-fourth and one-hundredth of the number of the whole picture element of a color original. In this case, it is advantageous to designate the margins of a picture frame except the principal subject image as background.

Sequentially, the image characteristic values are calculated for each image in order to make the scene classification of the negative image; and a proper exposure calculating formula is selected in accordance with the classified scene. By substituting the calculated image characteristic values into the selected formula, the calculation of printing exposure is performed by color. Based on the resulting printing exposure for each color, the filter adjusting section 19 controls each complementary color filter 16, 17, 18 to move from its starting position toward the inside or outside of the illumination light path 20, thereby adjusting the proportion of the three color components of the printing light.

After this adjustment, by operating a print key of the keyboard 47, the shutter 25 is opened for a certain time to allow the proper exposure of the color paper 26. Upon the completion of the exposure, the color paper 26 and the color negative 13 are transported by one frame, and each color filter 16, 17, 18 is caused to return to its starting position.

In the above embodiment, only the adjustment of the color filters 16, 17, 18 is effected in order to adjust the proportion of the three color components of the printing light for obtaining prints of proper color balance and density. However, there are some kinds of color negatives for which the color filters 16, 17, 18 are not enough to make proper correction. For these kinds of negatives, it may be effective to increase or decrease the exposure time by the shutter in steps and to complementarily adjust the color filters 16, 17, 18. For improperly exposed negatives (overexposed negatives, underexposed negatives, and negatives of back-lit subject matter), the exposure calculating formulas may be used for color correction by means of the color filters 16, 17, 18 and, if so, the shutter 26 is additionally controlled to vary the exposure time for density correction.

Figure 8:
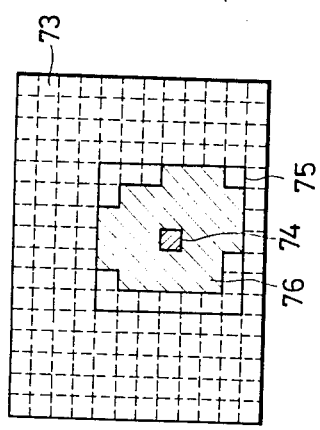
FIG. 8 is an explanatory illustration of an example of a touch panel sensor.

FIG. 8 shows an example of a touch sensor panel used for the position specifying means 60.

A touch panel sensor 80 allows the user to specify a particular part of the color negative by touching it by means of a finger 81, with the result that several picture elements will be included within the touched part. In this case a sequence shown in FIG. 9 is conducted for the determination of position and color of a standard picture element.

Reference is now had to FIGS. 9 through 12 for a detailed explanation of the flow chart of FIG. 6.

Figure 9:
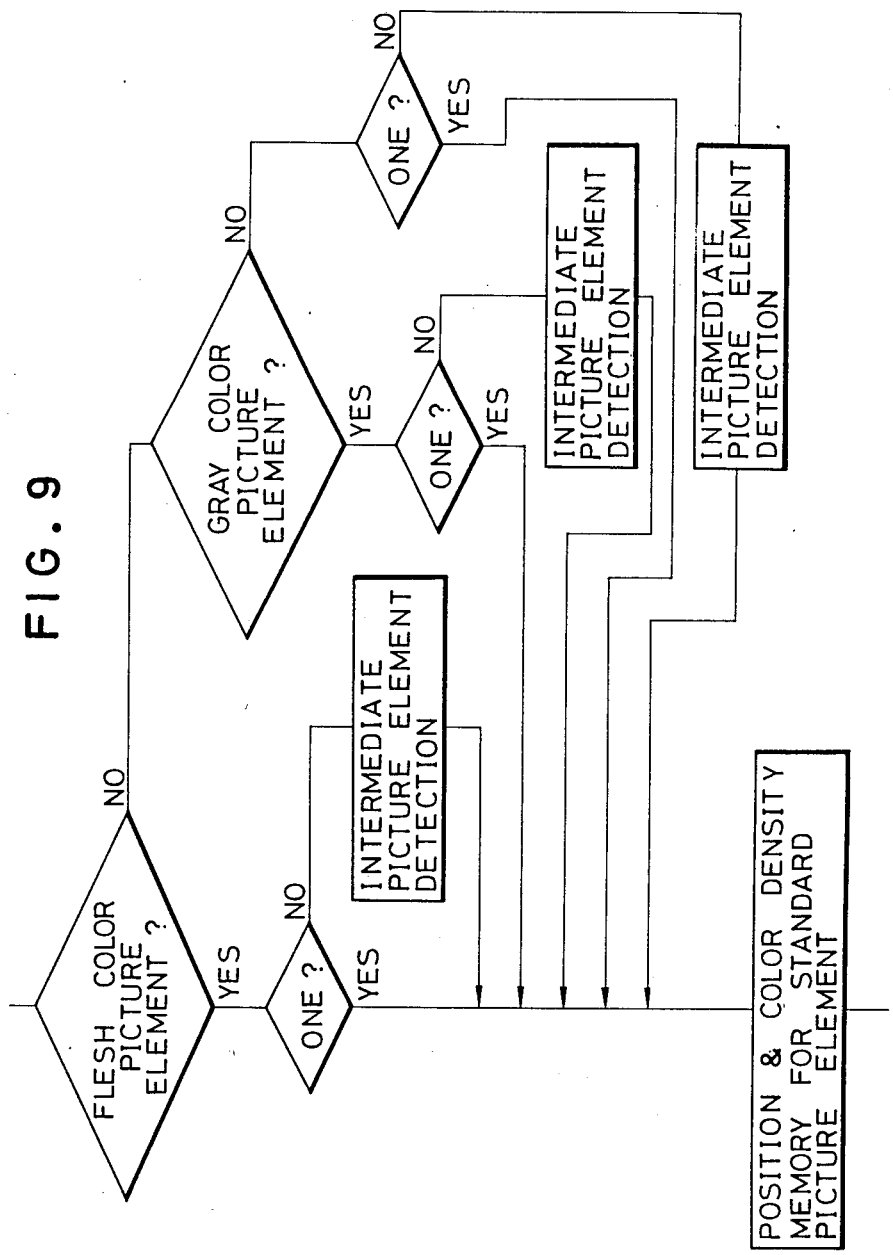
FIG. 9 is a flow chart showing a sequence of judging position and color density of a standard picture element.

As the first step, the sequence shown in FIG. 9 is executed in order to determine the position and color densities of the standard picture element.

Each picture element included within the part specified by the position specifying means 60 is judged as to whether or not it has flesh color. If in fact there is only one picture element having flesh color, that picture element is determined to be standard, and in this event, the flesh color previously defined is used based on which the color density judgment is made for each of the picture elements within the judging area. When there are plural picture elements of flesh color, a central one is designated as a standard picture element.

On the other hand, if there is no picture element having flesh color there among, then each picture element is judged as to whether or not it has gray color. As a result, if in fact there is one picture element of gray color, it is determined to be standard. When there are plural picture elements of gray color, a central one is designated as a standard picture element. Of course in this event the gray color density previously defined for the color density judgment of the picture elements within the judging area is used.

Furthermore, when on picture element of gray color is present in the specified part, one of the picture elements in the specified part is designated to be standard in the same way as for flesh or gray color.

Figure 10:
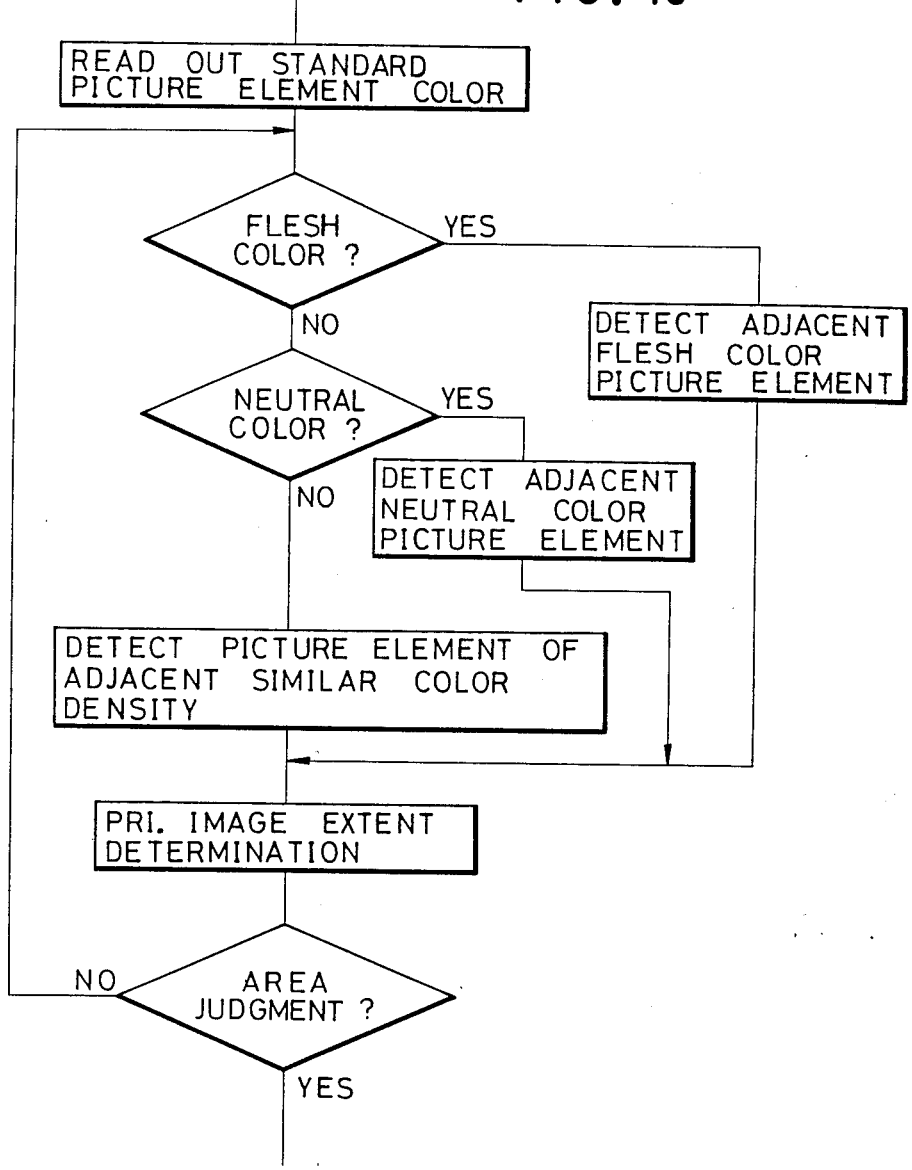
FIG. 10 is a flow chart showing a sequence of determining the extent of a principal subject image.

FIG. 10 shows the sequence of the color density judgment for defining the extent of principal subject images.

The color densities of the standard picture element determined or designated in the first step are retrieved, and a decision is made whether they are either within the defined flesh color or within the defined gray color, and the color densities are retrieved for each picture element within the judging area. Then the picture element is judged as to whether its color densities fall within the extent defining the color density of the standard picture element and whether it is adjacent to a picture element which is judged to have color densities falling within said extent. If the standard picture element is judged to have neither flesh color nor gray color, then each picture element is judged based on whether or not its color densities are identical or similar to the color densities of the standard picture element. From the results of this color density judgment, the principal subject image of the color original is determined by the extent defined by the picture elements judged to have color densities falling within the extent defining flesh color or gray color, or color densities identical or similar to the color densities of the standard picture element.

In the above-described color density judgment, the density comparison is performed on the basis of the difference in density between the standard picture element and each picture element, the absolute value of the difference or the ratio thereof. For example, when a picture element has its color density in the range of the difference of, for example, 0.05, the picture element is decided to be a piece of what defines the extent of principal subject image. In this case, when the red, green and blue color densities are used the density comparison is effected for each color. If any one of the color densities of a picture element is beyond the range, the picture element is decided to be not a part of the principal subject image.

Otherwise, the color density comparison is performed on the basis of a combined value obtained from two of the red, green and blue color densities, for example the difference in density between red and green, green and blue, etc. It is also permissible to use either the gray density (mean color density of the three color densities of red, green and blue, or mean color density of the weighted color densities of red, green and blue), or the ratio of the gray density relative to each color density. The gray density is, as is well known in the art, measured directly by an image sensor with no color filter provided.

It should be noted that the above-described standard color judgment of flesh color or gray color may be, if desirable, omitted in the process of the determination of principal subject image; for while such standard color judgment contributes to the improvement of the detection of picture elements, it is at the same time true that determined principal subject images probably vary widely.

In place of directly comparing picture elements with a standard picture element, it is permissible to use as standard values for the comparison the color densities of the picture element which has been decided to be a part of a principal subject image and is adjacent to a picture element to be subsequently compared, or the mean color densities of the picture elements which have theretofore been detected to be parts of a principal subject image.

Figure 11:
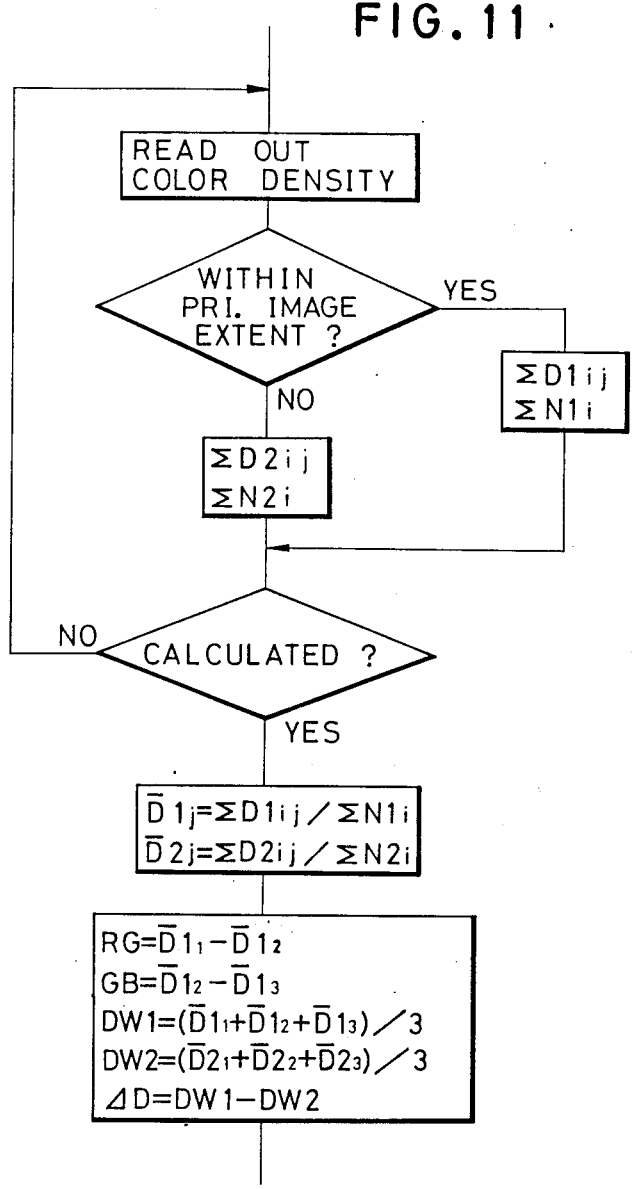
FIG. 11 is a flow chart showing a sequence of calculating image characteristic values and scene classification information.

FIG. 11 shows the sequence of calculating the image characteristic values and the information for the scene classification.

With reference to the results of the color density judgment stored in the image area table, the color densities of the respective picture elements retrieved from the RAM 45 in order are arranged into two groups for the principal subject image and the background image, and then added by color in each group. At this time, the picture elements of each group are counted to obtain the total number thereof.

In FIG. 11, D1 designates the color density of a picture element included in the principal subject image; D2 the color density of a picture element included in the background image; i the individual picture element; and j is the color: j=1, 2 and 3 means red, green and blue, respectively. Furthermore, N1 and N2 designate the numbers of picture elements included in the principal subject and background images, respectively.

The densities are added by color and divided by the number of picture elements to provide a mean color density for each color for each image. These mean color densities are represented by $\overline{D1}$ and $\overline{D2}$ in FIG. 11. These means color densities are used as the image characteristic values to obtain the information for a scene classification, namely, RG (difference between the mean densities of red and green of the principal subject image), GB (difference between the mean densities of green and blue of the principal subject image), and $\Delta D$ (difference between gray densities of the principal subject and background images). If it is desirable, red, green and blue mean color densities, or the combinations thereof may be used in place of using the above-mentioned $\Delta D$.

FIG. 12 shows the sequence of scene classification.

According to this sequence, a first rough scene classification is made based on the tints (RG, GB) of the principal subject image, and then finely by use of $\Delta D$. Subjects which are apt to be photographed as the principal subject matter and their colors are related as follows:

flesh color (FL)—human figures
gray color (Gr)—snow, structures, stone constructions green blue (G B)—scenes, plants.

According to the embodiment of the present invention, the color originals are roughly classified based on the tints of their principal subject image into four scenes of flesh color (FL), gray color (Gr), green~blue(G~B) and the others (Z), and then finely classified based on the gray color difference ($\Delta D$) into four scenes with values, $\Delta D < -0.01, -0.01 \leq \Delta < 0.05$, $0.05 \leq \Delta D < 0.20$ and $\Delta D \geq 0.02$. According to the classified scenes, the sixteen exposure calculating formulas F1 through F16 are selectively used. The relation between the classified scenes and the formulas is shown in Table 1.

TABLE 1

| Color | $\Delta D$ | | | |
|---|---|---|---|---|
| | < −0.10 | −0.10 ≦ <0.05 | 0.05 ≦ <0.20 | ≧0.20 |
| FL | F1 | F2 | F3 | F4 |
| Gr | F5 | F6 | F7 | F8 |
| GB | F9 | F10 | F11 | F12 |
| Z | F13 | F14 | F15 | F16 |

For the above formula F1, the following general formula is used to calculate the exposure E for each color.

$$E_j = -3.59 + (3.7 \times DFMX_j) + (1.8 \times DFMI_j) - (3.7 \times DCA_j) + (1.1 \times DCMX_j) + (0.5 \times DCMI_j) - (1.0 \times DLWA_j) + (1.1 \times DLWX_j) - (0.8 \times NHCH_j) - (2.3 \times NLCN_j) + (0.5 \times NSD_j) - (0.6 \times NGRAY)$$

wherein the characteristic values are defined as follows:
j is one of the colors red, green or blue
DFMXj is a maximum density of the whole image area
DFMIj is a minimum density of the whole image area
DCAj is a mean density of the central part of the image area
DCMXj is a maximum density of the central part of the image
DCMIj is a minimum density of the central part of the image
DLWAj is a mean density of the lower half section of the image
DLWXj is a maximum density of the lower half section of the image
NHCNj is the number of picture elements having a density higher than $0.8 \times (DFMX_j - DFMI_j) + DFMI_j$
NLCHj is the number of picture elements having a density lower than $0.2 \times (DFMX_j - DFMI_j) + DFMI_j$
NSDj is a mean contrast of the edges of image
NGRAY is the number or the total area of picture elements of gray color in the image.

According to the calculated exposures by color, the complementary color filters are respectively adjusted to control the proportion of the three color components of the printing light.

For the formulas F2 through F16, formulas which have the same shape as the formula F1 but have the coefficients different from each other are used according to the classified scenes of the color negatives.

It is permissible to use formulas including other kinds of image characteristic values in place of color densities.

It is also permissible to use the formulas F1 through F16 to obtain a mean exposure either for a single color or for the three primary colors. In this event, the exposure is determined on the basis of the mean exposure and the amount of color balance for each color otherwise calculated.

It may be acceptable to obtain the amount of exposure correction of the basic exposure which is determined by using, for example, the image characteristic values of the background image.

In the above description, although the scene classification is effected in accordance with the combinations of colors of the principal subject image and the gray color differences ($\Delta D$), it is not always necessary to use all the combinations listed in the table. It will be apparent to those skilled in the art that it is more advantageous to produce good prints at a high rate with a lesser number of classified scenes. In the event of the scene classification in accordance with only the color of the principal subject image, it is desirable to determine exposures on the basis of the color densities of the principal subject image. Also it may be permissible to perform the scene classification in accordance with the relative value between the image characteristic values of the principal subject image and the whole image. While this method is unequal in scene classification accuracy and the productivity of satisfactory color prints to the method employing the image characteristic value of background images, it is possible to perform the determination of exposures with a high accuracy compared with the conventional methods. It may be permissible to perform the scene classification in accordance with the kinds of principal subject images (for example, human figures, scenes, flowers, etc.) in place of the colors thereof. In this case, the operator distinguishes the kind of scene and directly inputs the data of the scene as a scene classifying factor through, for example, a keyboard.

While in the above embodiment, the exposure of each color (red, green and blue) is controlled by varying the quality of light in accordance with the amounts of insertion of the color filters into the optical path, it may be permissible to dispose cut-filters of cyan, magenta and yellow in the optical path, respectively, when the calculated exposure for each color is given to the color paper.

Although the description has been directed to a printing apparatus to which the present invention is applied, it is to be understood that the present invention is applicable also to apparatus for examining negatives.

What is claimed is:

1. A method of determining a principal subject image of a color original to be printed which comprises:
    measuring color densities of a number of picture elements into which said color original is divided;
    specifying a part of said color original by use of an image specifying means;
    comparing the measured color densities of each said picture element with the measured color densities of said specified part to detect picture elements of color densities having a certain relation to the measured color densities of said specified part; and
    determining said principal subject image of said color original by an extent which is defined by said picture elements of said color densities of said certain relation.

2. A method as defined in claim 1, wherein said detection of picture elements is performed picture element by picture element in a predetermined order, and said color density comparison of said each picture element is made based on the color densities of the picture element which is the latest one of said picture elements having been detected to be of said certain relation color densities till then.

3. A method as defined in claim 1, wherein said detection of picture elements is performed picture element by picture element in a predetermined order, and said color density comparison of said each picture element is made based on the mean color densities of all the picture elements which have been detected to be of said certain relation color densities till then.

4. A method as defined in claim 1, wherein said color densities are color densities of red, green and blue.

5. A method as defined in claim 4, wherein said certain relation color densities of each picture element to be detected are in a predetermined range either of the difference or of the ratio between the corresponding color densities of said specified part.

6. A method as defined in claim 1, wherein said color density is a value obtained from any one of the possible combinations of red and/or green and/or blue color densities.

7. A method as defined in claim 6, wherein said value is either a difference between or a ratio of any two of red, green and blue color densities, and said certain relation color density of each picture element to be detected is in a predetermined range either of said difference or of said ratio.

8. A method as defined in claim 6, wherein said value is a gray color density resulting from red, green and blue color densities.

9. A method as defined in claim 1, wherein said color density is a visual density.

10. A method as defined in claim 1, wherein said color density is a green color density.

11. A method as defined in claim 1, wherein said detection of picture elements is stopped when the number of the picture elements having been detected reaches a predetermined number.

12. A method of determining printing exposures by using a plurality of exposure calculating formulas which are selected in accordance with classified scenes of color originals which comprises:
   measuring color densities of a number of picture elements into which said color original is divided;
   specifying a part of said color original by use of an image specifying means;
   comparing the measured color densities of each said picture element with that of said specified part to detect picture elements of color densities having a certain relation to said color densities of said specified part;
   determining a principal subject image of said color original by an extent which is defined by said color densities of said certain relation and a background image thereof comprising at least a part of the remainder; and
   obtaining at least one kind of image characteristic value for each said image based on said measured color densities of the respective picture elements thereof in order to perform a scene classification of said color original.

13. A method as defined in claim 12, wherein said image characteristic value is a gray density obtained from the color densities of red, green and blue of all picture elements of said each image.

14. A method as defined in claim 13, wherein said scene classificaiton is performed on the basis either of the density difference between or of the ratio of the gray densities of said respective images.

15. A method of determining printing exposures by using a plurality of exposure calculating formulas which are selected in accordance with classified scenes of color originals which comprises:
   measuring color densities of a number of picture elements into which said color original is notionally divided;
   specifying a part of said color original by use of an image specifying means;
   comparing the measured color densities of each said picture element with that of said specified part to detect picture elements of color densities having a certain relation to said densities of said specified part;
   determining a principal subject image of said color original by an extent which is defined by said picture elements having color densities of said certain relation;
   obtaining at least one kind of image characteristic value both for said principal subject image and for the whole image of said color original based on said measured color densities of the respective picture elements thereof in order to perform the scene classificaiton of said color original.

16. A method as defined in claim 15, wherein said image characteristic value is a gray density obtained from the color densities of red, green and blue of all picture elements of each said image.

17. A method as defined in claim 16, wherein said scene classification is performed on the basis either of the density difference between or of the ratio of the gray densities of said respective images.

18. A method of determining printing exposures which comprises:
   measuring color densities of a number of picture elements into which a color original to be printed is divided;
   specifying a part of said color original by use of an image specifying means;
   comparing the measured color densities of each said picture element with that of said specified part to detect picture elements whose color densities are in a predetermined range either of the difference or of the ratio between the corresponding color densities of said specified part;
   determining a principal subject image of said color original by an extent which is defined by said detected picture elements;
   obtaining a color based on mean color densities of said principal subject image in order to classify the scene of said color original;
   selecting in accordance with said classified scene a formula from a plurality of exposure calculating formulas previously provided corresponding to scenes into which color originals are classified; and
   calculating the exposure of said color original to be printed by substituting said mean color densities into said selected formula.

19. A method of color printing by determining a principal subject image of a color original to be printed, which comprises:

measuring color densities of a number of picture elements into which said color original is divided;

specifying a part of said color original by use of an image specifying means;

comparing the measured color densities of each said picture element with the measured color densities of said specified part to detect picture elements having color densities having a certain relation to that of said specified part;

determining a principal subject image of said color original having an extent which is defined by said detected picture elements;

projecting printing light through said color original and onto a medium on which said color original is to be reproduced;

disposing adjustable color filters in the path of said printing light; and controlling the position of said filters and the duration of the exposure of said medium to said light responsive to the determination of said principal subject image thus detected.

20. A method of color printing by determining printing exposures by using a plurality of exposure calculating formulas which comprises:

measuring color densities of a number of picture elements into which said color original is divided;

specifying a part of said color original by use of an image specifying means;

comparing the measured color densities of each said picture element with that of said specified part to detect picture elements of color densities having a certain relation to said color densities of said specified part;

determining a principal subject image of said color original having an extent which is defined by said picture elements having color densities of said certain relation and a background comprising at least a part of the remainder;

obtaining at least one kind of image characteristic value for each image based on said measured color densities of the respective picture elements thereof in order to perform the scene classification of said color original;

selecting an exposure calculating formula in accordance with said classified scene of said color original;

calculating exposures for red, green and blue, respectively by use of said formula; and controlling printing light projected onto a medium on which said color original is to be reproduced in accordance with said calculated exposure for each color.

21. A method as defined in claim 20, wherein said exposure control is performed by projecting printing light through said color original and onto said medium, disposing adjustable color filters in the path of said printing light, and adjusting the positions of said filters and the duration of the exposure of said medium to said light responsive to said calculated exposure for each color.

* * * * *